UNITED STATES PATENT OFFICE.

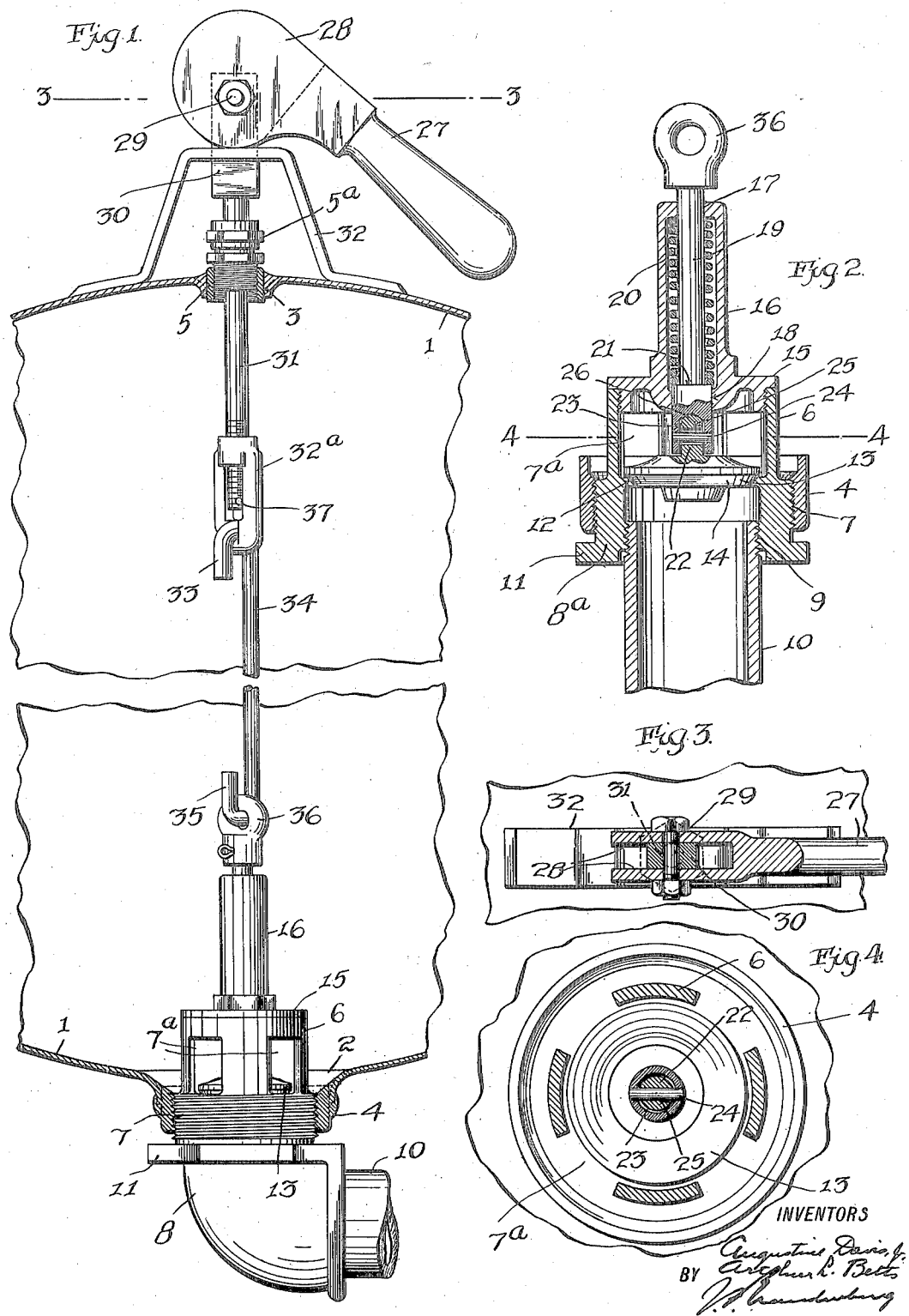

AUGUSTINE DAVIS, JR., OF COVINGTON, KENTUCKY, AND ARTHUR L. BETTS, OF CINCINNATI, OHIO; SAID BETTS ASSIGNOR TO SAID DAVIS.

EMERGENCY SHUT-OFF VALVE FOR TANKS.

1,284,063.        Specification of Letters Patent.        Patented Nov. 5, 1918.

Application filed November 24, 1917. Serial No. 203,738.

*To all whom it may concern:*

Be it known that we, AUGUSTINE DAVIS, Jr., and ARTHUR L. BETTS, citizens of the United States, and residents, respectively, of Covington, in the county of Kenton, State of Kentucky, and of Cincinnati, in the county of Hamilton, State of Ohio, have invented a new and useful Improvement in Emergency Shut-Off Valves for Tanks, of which the following is a specification.

The invention is an improvement in emergency shut-off valves for tanks, especially the tanks of oil tank wagons and trucks and tank cars. In these conveyances it sometimes happens that the outlet outside the tank becomes broken or damaged, in which event it is important to be able to stop the outflow, in order to prevent the loss and serious danger resulting from a discharge of the contents. The emergency valves which have heretofore been provided for this purpose have been open to objection. In one type, wherein a valve plug over the outlet opening in the bottom of the tank is operated by a screw and a handwheel at the top, the operation is necessarily relatively slow and there is no certainty of the attendant closing the valve completely. The other existing type with which I am familiar is quick-acting, depending for its operation upon a cam lever which normally holds the valve open against the tension of a spring and which only requires to be thrown over to allow the valve to seat. In this construction the valve seat has been formed on the margin of the outlet opening in the wall of the tank, and the valve rod has been guided in slide-bearings remote from each other and separate from the valve seat, one being in a bracket secured inside over the bottom and the other being at the top of the tank. Under these conditions the obtaining of a good alinement of the bearings and valve seat is uncertain, and there is corresponding likelihood of the valve not closing tightly. In order to secure as near an approach to alinement as possible, it is necessary to form the openings in the top and bottom of the tank, and to install the valve mechanism, after the construction of the tank shell has been completed, and this and any subsequent attention to the valve makes it necessary to enter and work within the tank, which is inconvenient and compels the provision of a man-hole. The operating lever, also, has been objectionable by reason of its tendency to swing horizontally about the axis of the valve rod, with the movement and jolting of the vehicle, turning the valve and valve rod with it and causing wear and noise. Also, in operating the lever, this radial play around the valve rod axis greatly increases the effort required to control the lever in throwing it over.

The present invention aims to overcome these defects. A valve unit comprising a cage, valve seat, guide and valve member is screwed upward into the bottom of the tank, from which it is removable, and the valve member is connected with the controlling means by an articulated connection which renders alinement of the upper and lower bearings immaterial. The valve unit and its operating connections can be assembled without entering the tank, all that is necessary being for a workman to insert his arm through a customary filling opening in the tank to manipulate the jointed and separable operating connections. The valve is assembled complete before being put into the tank, is removable, requires no packing at the joint and will not leak like riveted constructions. A closing spring is also contained in the valve unit, and being below the universally jointed connections cannot cause the latter to buckle. The rod to which the operating lever is pivoted, instead of being circular where it passes through the fulcrum bracket, is flattened to an oblong cross-section, the opening in the bracket being of similar form, and the greater horizontal dimension being in or parallel with the plane of operation of the lever, whereby both greater resistance to bending is secured and the handle is prevented from idle swinging. These and other features of the invention will become apparent as the specification proceeds.

In the accompanying drawings:

Figure 1 is a fragmentary cross-section through a tank, showing the valve mechanism in elevation and with the intermediate portion of its connecting rod broken away for economy of space. For convenience of illustration the elbow 8 and faucet pipe 10 are represented as turned transversely of the tank, though in actual practice they will be at right angles to the illustrated position, the faucet being at the rear end of the tank.

Fig. 2 is a view in vertical section, with interior portions in elevation, of the valve unit at the bottom, the pipe-fitting portion of the valve body being straight instead of curved.

Fig. 3 is a cross-section on the line 3—3 of Fig. 1.

Fig. 4 is a cross-section on the line 4—4 of Fig. 2.

The tank shell 1 has openings 2 and 3 in its bottom and top, the openings being flanged outward and the lower one being larger than the upper. In these openings collars 4 and 5, formed with internal pipe threads, are welded, so as to be in effect integrally united with the tank. The upper collar 5 receives a stuffing-box 5$^a$ with gland, and the lower collar 4 a valve, comprising a cylindrical body 6 having an externally threaded portion 7 to screw into the collar. The valve cage part of this body which extends upward into the interior of the tank is provided with lateral openings 7$^a$ for free inlet of the oil; and below the collar the valve body is extended downward to constitute a fitting 8 or 8$^a$, having an internal screw-thread 9 which receives the pipe 10 leading to the faucet. The fitting may be either elbow or straight, as illustrated, respectively, in Figs. 1 and 2. A hexagon enlargement 11 on the lower part of the body facilitates insertion and removal of the valve.

A beveled valve seat 12 is formed on an annular ledge in the interior of the cage at the base of the openings 7$^a$, and with this seat coöperates a horizontal valve disk 13, the lower marginal seating portion 14 of which is preferably formed on a curve.

The valve cage has a top 15 secured therein and provided with an upward tubular extension 16, constituting a spring barrel having a reduced bearing opening 17 at the top. In this, and in another bearing opening 18 at the bottom of the barrel, a short rod section or valve stem 19 is slidably guided, being constantly acted upon by a helical spring 20 confined between a shoulder 21 on the rod and the top of the barrel and thereby tending to depress and close the valve.

It will thus be seen that the bearings for the valve stem are close to the valve seat and are united rigidly therewith; and for reasons which will presently appear the operation of the stem in these bearings is quite unaffected by alinement conditions above. Still further to insure a perfect seating of the valve, the valve stem may be articulated below its bearings, a stub 22 being formed upon the top of the valve disk to enter a socket 23 in the lower end of the main body of the stem. The socket is made slightly large for the stub, which is held therein by a cross-pin 24 fixed to the socket and loosely engaged by a hole 25 in the stub. In this way a limited amount of side play is permitted to the valve member, enabling it to find its seat with accuracy; and at the same time the pin 24 is not subjected to strain, by reason of the fact that in the downward movement the conical top of the socket cavity bears upon the rounded head 26 of the stub before the pin can touch the bottom of the cross-opening in the stub.

The operating cam lever 27 at the top of the tank has its bifurcated cam portion 28 pivoted at 29 to the upper portion 30 of a rod 31, the main cylindrical portion of which passes through the stuffing-box 5$^a$ into the interior of the tank. The said upper portion 30 is formed with an oblong cross-section, being preferably made of a separate piece welded onto the body of the rod. A fulcrum bracket 32 rising from the top of the shell has a similar opening through which the flat stem 30 passes, and as clearly seen in Fig. 3 the greater dimension of the oblong cross-section lies in the plane of the handle, whereby the advantages heretofore referred to are obtained.

The lower end of the rod 31 is screw-threaded as shown to coöperate with a turnbuckle stirrup 32$^a$, which is engaged by the upper hooked end 33 of a connecting rod 34. A similar hook 35 on the lower end of this rod is passed through an eye 36 secured upon the upper end of the valve stem 19. Thus an articulated connection is provided between the valve stem guided in its bearings in the valve body and the rod 31 connected with the cam lever and guided in its independent bearings in the stuffing-box 5$^a$ and fulcrum bracket 32. This connection, with its universal joints at two places, always operates in tension, being pulled up at the top by the lever 27 to open the valve and pulled down at the bottom by the spring 20 to close the valve. A laterally projecting pin 37 inserted into the upper portion of the connecting rod between the limbs of the turn-buckle serves to prevent relative turning of these parts after the proper adjustment has been made in the assembling of the mechanism.

What we claim as new is:

1. The combination with a tank having a bottom outlet opening and a delivery pipe leading therefrom, of an emergency shut-off valve unit at the bottom of the tank comprising a valve body screwed upward into the outlet opening and removable downward therefrom and containing a valve seat and a bearing, a vertically movable valve member in the body guided by said bearing and coöperative with said seat, control means, and connections between the same and the valve, said connections extending upward in the tank from the valve member and including means of disconnection.

2. The combination with a tank having a bottom outlet opening and a delivery pipe leading therefrom, and a screw collar integrally united with the tank at said opening, of an emergency shut-off valve unit at the bottom of the tank comprising a valve body screwed upward into said collar and removable downward therefrom and containing a valve seat and a bearing, control means, and connections between the same and the valve, said connections extending upward in the tank from the valve member and including means of disconnection.

3. The combination with a tank having a bottom outlet opening with a delivery pipe leading therefrom, of an emergency shut-off valve unit at the bottom of the tank comprising a valve body screwed upward into the outlet opening and removable downward therefrom and containing a valve seat and a bearing, a vertically movable valve member in the body guided by said bearing and coöperative with said seat, a spring for closing the valve member also contained in the valve unit, control means adapted normally and securely to hold said valve member open, and connections extending upward in the tank from the valve member and connecting with said control means.

4. The combination with a tank having a bottom outlet opening, of an emergency shut-off valve unit at the bottom of the tank comprising a valve body screwed upward into said outlet opening and removable downward therefrom and containing a valve seat and a bearing, and a vertically-movable valve member in said body guided by the bearing thereof and coöperative with the valve seat, valve-controlling means, vertically extending doubly universally jointed connections between the valve and the valve-controlling means, and a spring for closing the valve included in the valve unit and acting below said universally jointed connections.

5. The combination with a tank having a bottom outlet opening, of an emergency shut-off valve unit at the bottom of the tank inserted in said opening and comprising a valve body having a valve seat and a bearing, and a spring-closed valve member in the valve body guided by said bearing, valve-controlling means, a rod at the top of the tank connected with said valve-controlling means, a bearing for said rod, and a connecting rod in the tank between said top rod and the valve and having universal connections with both.

6. The combination with a tank having a bottom outlet opening, and an internally screw-threaded collar united to the tank at said opening, of an emergency shut-off valve unit at the bottom of the tank comprising a body screwed upward into said collar and removable downward therefrom and having a valve seat and a bearing, a vertically movable spring-closed valve member in the body guided by said bearing, valve-controlling means, and a connecting rod having universal connections with the valve-controlling means and valve member.

7. The combination with a tank having a bottom outlet opening, and a collar united to the tank at said opening, of an emergency shut-off valve member at the bottom of the tank comprising a valve body inserted upward into said collar and removable downward therefrom and having a valve seat and a bearing, a vertically movable spring-closed valve member in the body guided by said bearing, a stuffing box on top of the tank, a rod passing through said stuffing box, and a connecting rod universally jointed to the lever rod and valve member.

8. The combination with a tank having a bottom outlet opening, and a collar united to the tank at said opening, of an emergency shut-off valve unit at the bottom of the tank comprising a valve body screwed upward into said collar and removable downward therefrom and containing a valve seat and a bearing, a valve stem guided in said bearing, a spring-closed valve member in the body coöperative with the seat thereof and universally jointed to the valve stem, valve controlling means, and a connecting rod universally jointed both to the valve-controlling means and to the valve stem.

9. The combination with a tank having a bottom outlet opening, of a valve unit inserted upward in said opening and removable downward therefrom and comprising a valve body containing a valve seat and a bearing, and a vertically movable spring-closed valve member guided by said bearing and coöperative with said seat, valve-controlling means, and detachable flexible connections extending vertically between the valve and valve-controlling means.

10. The combination with a tank having a bottom outlet opening, and a collar united to the tank at said opening, of a valve unit at the bottom of the tank comprising a hollow body inserted upward into said collar and removable downward therefrom, said valve body comprising a cage in the interior of the tank having inlets, a valve seat below the inlets, and a top provided with a tubular extension, a valve member in the cage, a valve stem guided in the top and passing through said tubular extension, and a valve-closing spring in the tubular extension around the valve stem, quick-acting valve-controlling means, and universally jointed connections between the valve-controlling means and the valve stem.

11. The combination with a tank having a bottom outlet, of a spring-closed valve member guarding said outlet, a cam lever on top of the tank, a fulcrum bracket, and means for connecting the lever and valve including a rod connected to the lever and passing through the fulcrum bracket, the portion of said rod which passes through the bracket and the opening accommodating the same being of oblong cross-section, with the greater dimension lying substantially in the plane of operation of the lever.

12. The combination with a tank having a bottom outlet opening, of a valve body inserted in said opening and containing a valve seat and bearing, a valve member in the body guided by said bearing, a cam lever at the top of the tank, a vertically guided lever rod, and a connecting rod having hook and eye connections with said rod and valve member, one of said connections including a turn-buckle.

13. In a shut-off valve, a valve element movable toward and from its seat and having a valve stem and a bearing therefor, the valve stem having a socketed articulation below the bearing permitting limited lateral play to the valve element and including a cross-pin loosely uniting the members of the articulation together, the members being further provided with thrust surfaces adapted to contact and protect the pin from strain upon closing of the valve.

AUGUSTINE DAVIS, Jr.
ARTHUR L. BETTS.